United States Patent
Cella et al.

(10) Patent No.: US 9,010,365 B2
(45) Date of Patent: Apr. 21, 2015

(54) BREATHER WITH INDEPENDENT INLET/OUTLET FLOW PATHS

(75) Inventors: Albert F. Cella, Sylvania, OH (US); Donald J. Gembolis, Toledo, OH (US); John A. Trott, Chicago, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 720 days.

(21) Appl. No.: 12/993,558

(22) PCT Filed: May 21, 2009

(86) PCT No.: PCT/US2009/044769
§ 371 (c)(1),
(2), (4) Date: Nov. 19, 2010

(87) PCT Pub. No.: WO2009/143310
PCT Pub. Date: Nov. 26, 2009

(65) Prior Publication Data
US 2011/0067392 A1    Mar. 24, 2011

Related U.S. Application Data

(60) Provisional application No. 61/054,862, filed on May 21, 2008.

(51) Int. Cl.
*B29C 47/68* (2006.01)
*B60T 17/06* (2006.01)
(Continued)

(52) U.S. Cl.
CPC .............. *B60T 17/06* (2013.01); *F16K 17/196* (2013.01); *B60T 11/26* (2013.01); *B60T 17/222* (2013.01)

(58) Field of Classification Search
CPC ............................. F16K 17/196; F16K 17/19
USPC .................. 60/453, 454, 455, 585, 586, 587; 220/203.24, 203.26, 203.28, 372, 371, 220/367.1, 203.27, 203.02, 203.01, 203.29; 215/315, 311, 309, 308; 137/493.6, 137/545, 549, 550, 614.21
See application file for complete search history.

(56) References Cited

U.S. PATENT DOCUMENTS 973,440 A * 10/1910 Kessler .................... 220/88.2
1,493,083 A * 5/1924 Ripley ..................... 137/493.9
(Continued)

FOREIGN PATENT DOCUMENTS

DE    37 28 542 A1    3/1989
DE    37 34 421 A1    4/1989
(Continued)

OTHER PUBLICATIONS

International Search Report and Written Opinion for corresponding International Application No. PCT/US2009/044769.
(Continued)

*Primary Examiner* — Edward Look
*Assistant Examiner* — Michael Quandt
(74) *Attorney, Agent, or Firm* — Renner, Otto, Boisselle & Sklar, LLP

(57) ABSTRACT

The present invention provides an apparatus and method for filtering fluid in a breather assembly and providing uncontaminated fluid to a reservoir. The breather allows in-take fluid traveling through a first flow path to be filtered before entering the reservoir through a first directional valve. The breather also allows exhaust fluid traveling through a second flow path, separate from the first flow path, to exit through a second directional valve.

18 Claims, 5 Drawing Sheets

(51) Int. Cl.
  *F16K 17/196* (2006.01)
  *B60T 11/26* (2006.01)
  *B60T 17/22* (2006.01)

(56) References Cited

U.S. PATENT DOCUMENTS

| | | | | |
|---|---|---|---|---|
| 1,498,358 | A | * | 6/1924 | Krafft ................ 137/493.9 |
| 1,918,807 | A | * | 7/1933 | Glab .................. 220/203.02 |
| 1,973,258 | A | * | 9/1934 | Jensen ............... 220/203.26 |
| 2,028,754 | A | * | 1/1936 | Crecca et al. ........... 137/173 |
| 2,086,969 | A | * | 7/1937 | Strelow .................. 137/43 |
| 2,103,935 | A | * | 12/1937 | Cossais .............. 137/251.1 |
| 2,642,052 | A | * | 6/1953 | Wagner et al. .......... 123/573 |
| 2,894,530 | A | * | 7/1959 | Stevens et al. ......... 137/493.7 |
| 3,699,999 | A | * | 10/1972 | Dunkelis ............ 137/493.4 |
| 3,722,535 | A | | 3/1973 | Raupp |
| 3,785,401 | A | | 1/1974 | Button |
| 3,825,147 | A | * | 7/1974 | Noponen et al. ....... 220/203.24 |
| 4,342,329 | A | * | 8/1982 | Roff .................... 137/202 |
| 4,476,995 | A | | 10/1984 | Bellino et al. |
| 4,886,019 | A | * | 12/1989 | Davis et al. ............ 123/41.86 |
| 5,240,027 | A | * | 8/1993 | Vertanen ................. 137/73 |
| 5,282,492 | A | * | 2/1994 | Angeli .................. 137/493.4 |
| 5,341,951 | A | | 8/1994 | Springston |
| 5,479,978 | A | * | 1/1996 | Zenkich ............... 137/493.3 |
| 5,803,115 | A | * | 9/1998 | Vertanen et al. ....... 137/493.9 |
| 6,009,846 | A | | 1/2000 | Walker, Jr. |
| 2003/0062371 | A1 | | 4/2003 | Hirao |

FOREIGN PATENT DOCUMENTS

| | | |
|---|---|---|
| DE | 37 44 010 A1 | 7/1989 |
| DE | 42 01 565 A1 | 7/1993 |
| GB | 2 254 317 A | 10/1992 |
| JP | 2000-304001 | 10/2000 |

OTHER PUBLICATIONS

International Preliminary Report on Patentability for corresponding International Application No. PCT/US2009/044769.

* cited by examiner

BREATHER WITH INDEPENDENT INLET/OUTLET FLOW PATHS

RELATED APPLICATIONS

This application is a national phase of International Application No. PCT/US2009/044769 filed May 21, 2009 and published in the English language, which claims priority to U.S. Provisional Application No. 61/054,862 filed May 21, 2008.

FIELD OF INVENTION

The present invention relates generally to fluid filtration, and more particularly to a breather for fluid filtration in a fluid system.

BACKGROUND

Certain hydraulic systems, such as those found in mobile fluid power applications, include a tank or reservoir that receives and stores hydraulic fluid. These hydraulic systems often create pressures and vacuums within the tank or reservoir during use. Breather vents are typically provided in the tank to ensure that uncontaminated air is provided into the system and that the proper pressures are maintained for efficient and safe operation of the system. These vents allow air to enter the tank or reservoir when the pressure is low, and allow air to be expelled from the tank or reservoir when the pressure is high.

As can be appreciated, such vents are subject to degradation and wear over time. A blocked or inoperable vent can prevent the proper escape or introduction of gasses and air into a tank during operation. In addition, vent gases can include oil vapor, which raise environmental and cleanliness issues if allowed to escape freely. Likewise, ambient air entering the tank through a vent can include particles or liquid that can mix with and contaminate the hydraulic fluid.

Further, when a breather becomes saturated with reservoir vapor, the system must work harder in order to receive fluid. This reduces the efficiency of the system and can lead to an increased pressure drop in the system. The greater the pressure drop in the system, the greater the likelihood that the system will be starved, resulting in cavitation. Additionally, leaks can occur resulting in hydraulic fluid escaping to the surrounding areas of system.

SUMMARY OF INVENTION

The present invention provides an apparatus and method for filtering fluid in a breather assembly and providing uncontaminated fluid to and from a reservoir. The breather allows in-take fluid traveling through a first flow path to be filtered before entering the reservoir through a first directional valve. The breather also allows exhaust fluid traveling through a second flow path, separate from the first flow path, to exit through a second directional valve. Accordingly, the apparatus and method can balance the pressures in the reservoir and filter fluid such that filtration capabilities are increased, oil exhaust is reduced, and the hydraulic system is better protected.

More particularly, included is a breather apparatus for use with a reservoir, the breather apparatus providing for the flow of uncontaminated fluid to and from the reservoir along separate flow paths. The apparatus may include a housing having an inlet for receiving fluid, an outlet for expelling fluid, and a port for fluidic communication with a reservoir. The housing encloses a first directional valve and a second directional valve for regulating fluid flow to and from the reservoir, a filtration/separation device disposed in a first flow path between the inlet and the port for filtering the fluid received at the inlet, and a second flow path between the port and the outlet, wherein the first flow path is separate from the second flow path.

In another embodiment, the housing may further include a liquid/particulate separation device disposed in the second flow path between the port and the outlet for filtering fluid expelled from the reservoir. In particular, the liquid/particulate separation device disposed in the second flow path may include a coalescing media.

In another embodiment, the first and second directional valves may be configured in reverse orientation. The apparatus may include a wall that divides a chamber in the housing into the first and the second flow paths. In particular, the wall may include a plate that divides the chamber into the flow paths. In still another embodiment, the first and second directional valves may be concentric. Additionally, the first directional valve may be disposed in a body of the second directional valve. Further, the second directional valve may include a movable piston responsive to pressure in the reservoir. Still further, the piston may be spring-biased and the piston may be disposed in the housing against a seal.

The filtration/separation device disposed in the first flow path and the liquid/particulate separation device disposed in the second flow path may be concentrically arranged in the housing. Additionally, the liquid/particulate separation device disposed in the second flow path may include a coalescing polyurethane foam. Further, the filtration/separation device disposed in the first flow path may filter the fluid received at the inlet for contaminates and liquid and the liquid/particulate separation device disposed in the second flow path may coalesce fluid from the fluid expelled from the reservoir. The fluid coalesced in the liquid/particulate separation device disposed in the second flow path may be returned to the reservoir via a drain. The breather apparatus may be in combination with the reservoir, with the breather having its port in combination with a port of the reservoir.

Moreover, the present invention provides a method for filtering fluid in a breather where the breather has an inlet and outlet, a filtration/separation device and a liquid/particulate separation device, at least a first and second directional valve, and a first flow path separate from a second flow path. The method includes receiving fluid in a reservoir via the first flow path to provide fluid in the reservoir, wherein fluid enters the inlet, is filtered in the filtration/separation device, and enters the reservoir through the first directional valve. The method also includes expelling fluid from the reservoir via the second flow path when there is a pressure build up in the reservoir, wherein fluid exits the reservoir through the second directional valve, is coalesced in the liquid/particulate separation device, and exits the outlet.

Receiving fluid may include using a directional valve disposed in a body of a movable piston, and expelling fluid may include using the movable piston. Additionally, the piston may travel against a spring allowing fluid to flow through the second flow path. Further, the piston may travel further against the spring to allow the fluid to flow through the second flow path and the first flow path. Still further, receiving and expelling fluid may also include using the first and second directional valves configured in reverse orientation.

The foregoing and other features of the invention are hereinafter described in greater detail with reference to the accompanying drawings.

DETAILED DESCRIPTION

Figure 1:
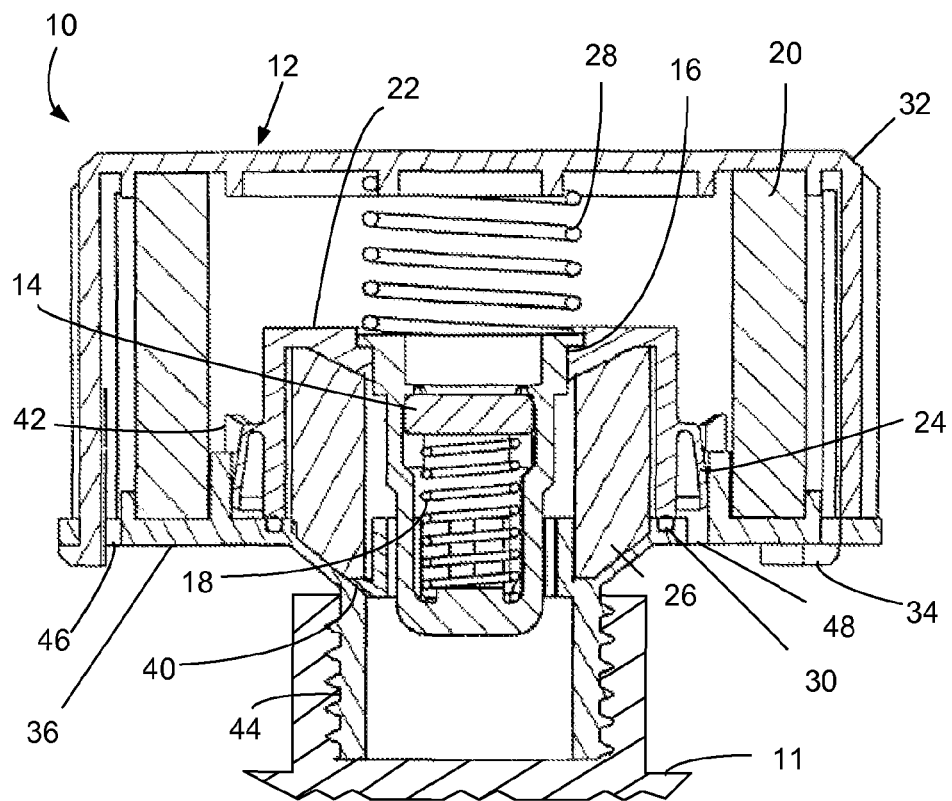
FIG. 1 is a cross-sectional view of an exemplary breather assembly according to the invention.
Figure 2:
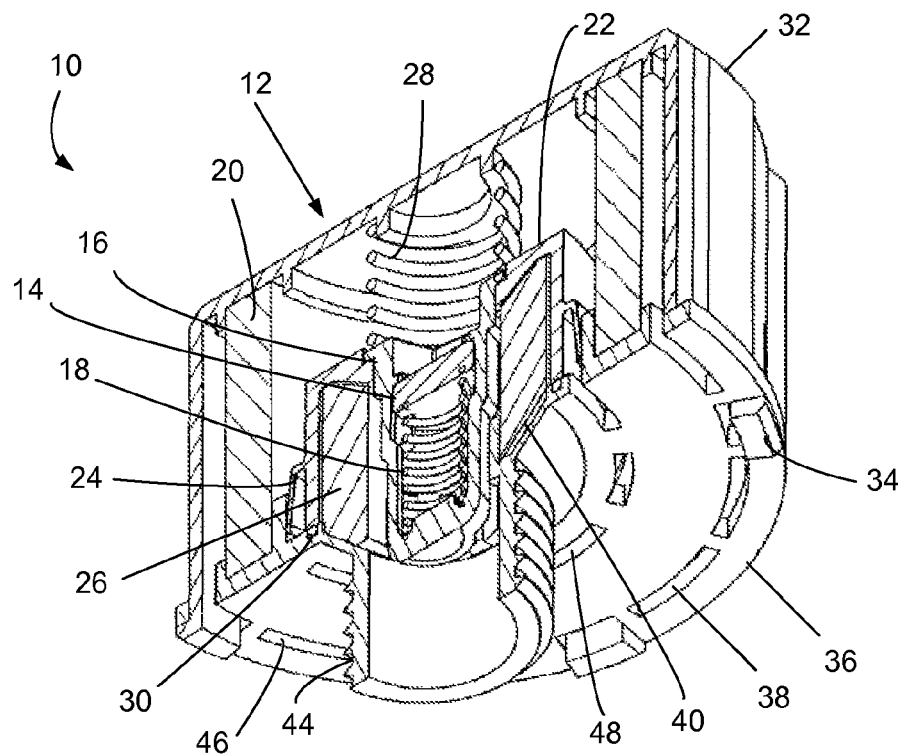
FIG. 2 is a cross-sectional perspective view of an exemplary breather assembly according to the invention.
Figure 7:
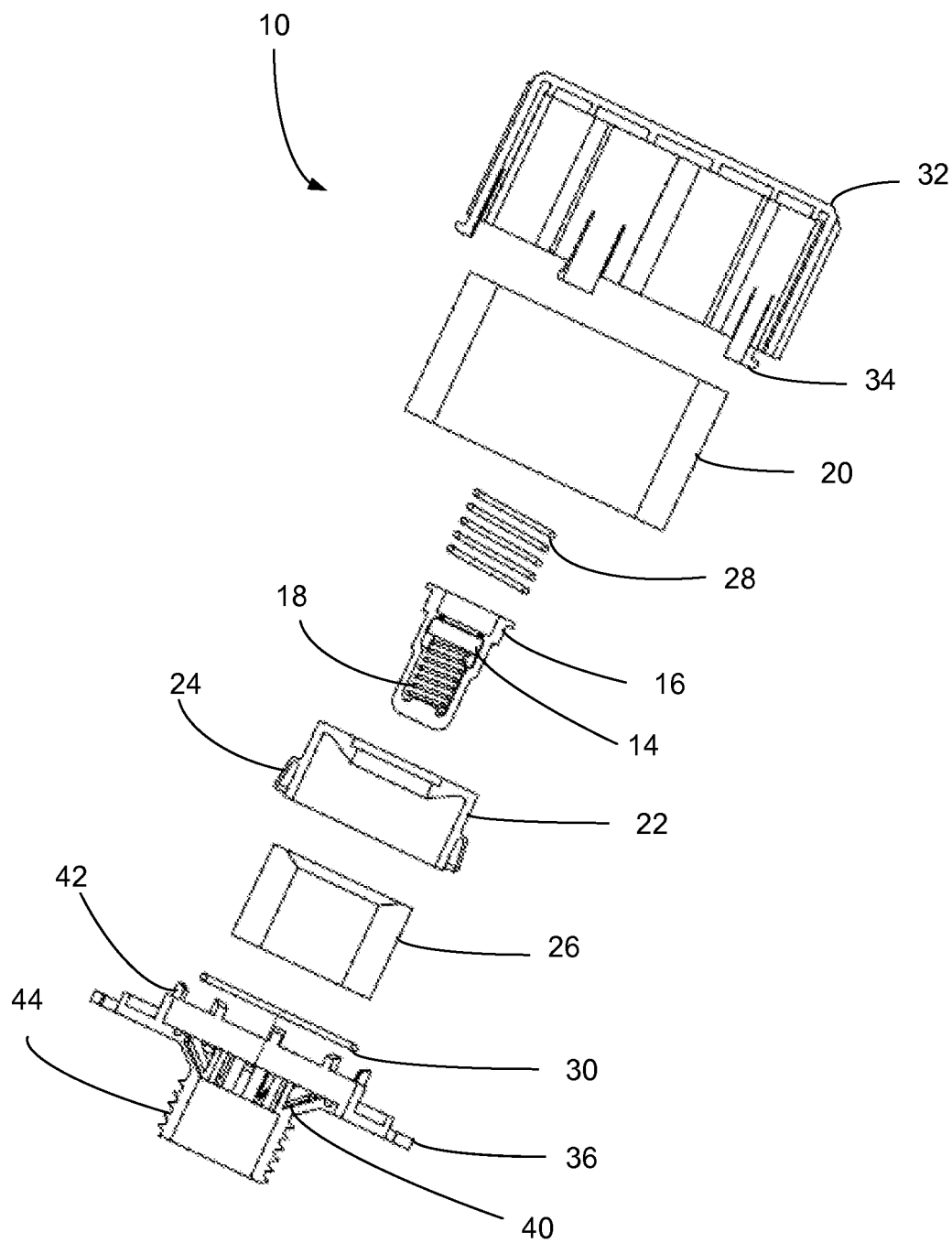
FIG. 7 is an exploded view of the breather assembly of FIG. 1.

Referring now to the drawings in detail, and initially to FIGS. 1, 2 and 7, an exemplary breather assembly according to the invention is indicated generally by reference numeral 10. The breather assembly 10 can be used in hydraulic systems, such as in industrial and mobile equipment, or in other fluid transfer systems, to provide uncontaminated fluid, in particular a gas, into the systems. The breather assembly 10 can also be used to prevent oil mist from escaping the systems and to provide a charge pressure on the reservoir of the systems. The breather assembly 10 generally includes a housing 12 that encloses a first directional valve 14 and a second directional valve 22, a filtration/separation device 20 disposed in a first flow path, and a second flow path. These major components as well as other components of the device can be made of any suitable material, such as, for example, a polymer material such as nylon or polypropylene, metals, etc.

The first and second directional valves 14 and 22 are responsive to pressures in a reservoir 11 for moving the valves 14 and 22 from a closed position to an open position to permit fluid flow through the breather assembly 10. When the breather 10 is not receiving or expelling fluid, such as air or other gas or vapor, the first and second directional valves 14 and 22 are biased toward a closed position by suitable means to prevent fluid flow below certain pressures. In one embodiment, the first directional valve 14 may be biased against a valve seat 16 toward the closed position by a spring 18 and the second directional valve 22 may be biased toward the closed position by a spring 28. The springs 18 and 28 can be of varying forces to allow air to enter and exit the system based on a desired reservoir pressure.

The second directional valve 22 may consist of a movable piston that is responsive to pressure in the reservoir 11, and may be seated by the spring 28 making the piston spring-biased. The first directional valve 14 can be disposed in the body of the movable piston, preventing air from escaping the assembly 10 when the movable piston is in a closed position seated against seal 30. The second directional valve 22 can have a lip seal 24 integrally formed with the valve 22 that prevents air from entering the breather 10 through outlet 48 and also prevents air expelled from the reservoir 11 from entering the first flow path. As shown, the first and second directional valves 14 and 22 are concentric, although it should be appreciated that other configurations are possible, such as a side by side configuration described in detail below.

Referring now to the filtration/separation device 20, the device 20 may be of any suitable type for filtering particulates and/or separating liquid from the air. In a preferred embodiment the filtration/separation device 20 may be a filtration device such as paper, glass, a melt blown filtration device, etc., although it will be appreciated that other types of filtration/separations devices can be used. Along with the filtration/separation device 20, also enclosed in the housing 12 is a liquid/particulate separation device 26 disposed in the second flow path, the second flow path being separate from the first flow path. The liquid/particulate separation device 26 may be of any suitable type for separating a liquid and/or filtering particulates from the air passing through the device 26. In a preferred embodiment, the liquid/particulate separation device 26 may be a coalescing media, filtration device, tortuous path, or any other way of separating a liquid droplet or mist from a gaseous stream or causing a change in the direction of a gas. The devices 20 and 26 can separate particulates out of the air to maintain air quality in the reservoir 11, prevent contamination of fluid in the reservoir 11, and separate fluid out of the air to promote cleanliness of the surrounding environment.

As mentioned above, the filtration/separation device 20 may be disposed in the first flow path, but may also be disposed in both the first and second flow paths. It should be noted that although the filtration/separation device 20 may be disposed in both the first and second flow paths, the flow paths would remain separate from one anther. Separating the flow paths ensures that the filtration/separation device 20 is not exposed to oil mist in the reservoir 11, which would increase the pressure drop across the filtration/separation device 20. By preventing pressure drops across the filtration/separation device 20, the system is not starved, thereby preventing cavitation. Separating the flow paths also prevents reverse flow to the filtration/separation device 20 and/or liquid/particulate separation device 26 that would adversely affect the filtration capabilities of the devices. Further, separating the flow paths allows for increased filtration efficiency, reduced oil exhaust, and protection of the system.

Referring again to FIG. 1, to form the housing 12, a cap 32 and a base 36 are provided, which may be removably coupled to one another by locking members 34 on the cap 32 that lock the cap 32 to openings 38 in the base 36. For example, the locking members 34 may be resilient tabs that are snap fit into the openings 38. In one embodiment, the openings 38 that the locking members 34 couple to, can also act as the inlet 46. The cap 32 may be removably coupled to the base 36 by other suitable means, however, such as by clamps, fasteners, adhesives, ultrasonic welding, etc. The base 36 can include a port 44, or be coupled to the port 44, for making fluidic communication with the reservoir 11. The port 44 is provided with a threaded portion to secure the breather 10 to the reservoir 11, although the breather 10 may be secured to the reservoir 11 by other suitable means such as by fasteners, clamps, etc. The port 44 may be coupled to the reservoir 11 by the threads, coupled to a hose that is coupled to the reservoir 11, etc. An opening is provided in the base 36 leading to the port 44, wherein a seal 30 can be disposed that seals the second directional valve 22 with the opening in the base 36 to prevent air leakage in the breather 10. The seal 30 may be of any suitable type such as a bellows seal, o-ring, etc. Although the housing 12 is shown as including the cap 32 and the base 36, the housing 12 may be formed as one part or as multiple parts in varying configurations. An exploded view of the breather assembly 10 is shown in FIG. 7, which provides an example of how the parts of the assembly 10 communicate.

Referring again to FIG. 2, an inlet 46 for receiving air and an outlet 48 for expelling air are shown concentrically configured in the housing 12. The inlet 46 and outlet 48 are disposed in the base 36 of the breather 10, although it should be noted that the inlet 46 and outlet 48 can be located in various locations on the breather assembly 10 and are not limited to being concentrically configured in the housing 12. The filtration/separation device 20 can be disposed in the first flow path between the inlet 46 and the port 44, and the liquid/particulate separation device 26 can be disposed in the second flow path between the port 44 and the outlet 48. The devices filtration/separation device 20 and the liquid/particulate separation device 26 may also be concentrically configured in the housing 12, but are not limited to such a configuration.

Figure 3:
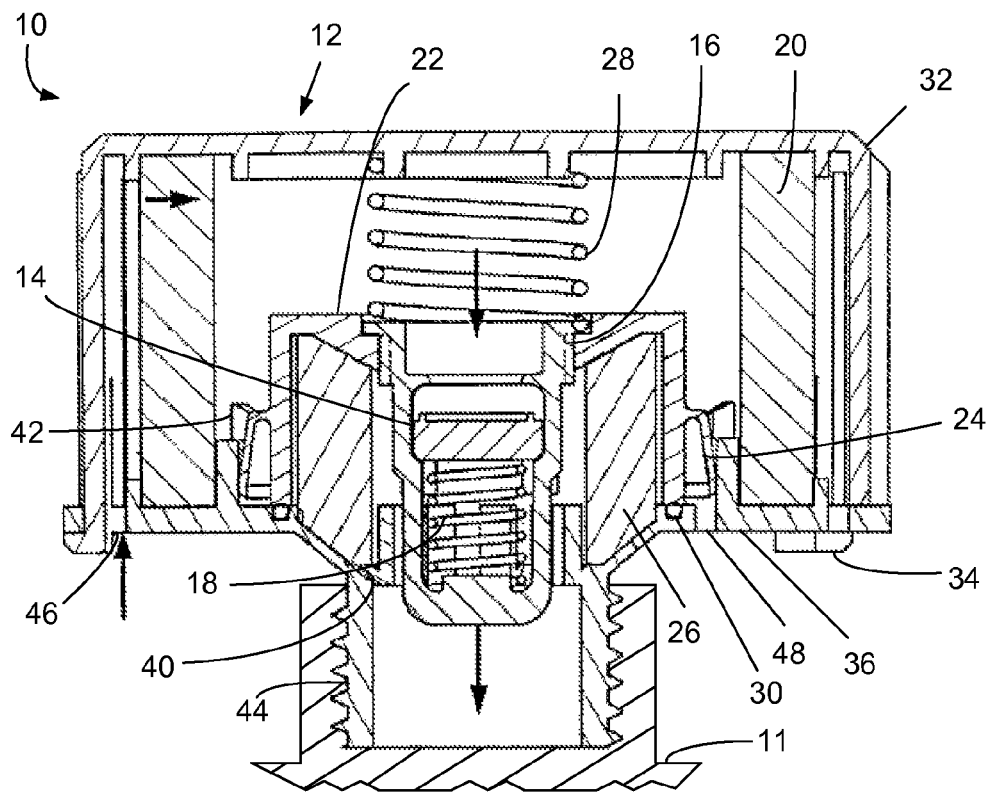
FIG. 3 is a cross-sectional view similar to FIG. 1, but showing the breather assembly in an in-take flow condition.

Referring now to FIG. 3, illustrated is a condition of the breather assembly 10 when intake flow is supplied to the reservoir 11. When a system, such as a hydraulic system, requires air due to the pressure in the system, the system can receive air through the breather assembly 10. When this occurs, the first directional valve 14, which can be a direct acting poppet valve, a movable piston, etc., opens to allow air to flow from outside the breather 10 into the reservoir 11. Preferably, the pressure at which the valve 14 operates is low because the higher the operation pressure the greater the chance that the system will be starved of air resulting in cavitation.

More specifically, air enters the breather assembly 10 through the inlet 46 when the system requires air. The air passes through the first flow path into the filtration/separation device 20 where particulates, liquid, and contaminates can be separated from the air. Depending on the desired application, the filtration/separation device 20 can have different efficiency ratings to determine the extent of the filtration required. The air then continues to flow through the first flow path toward the first directional valve 14 that is in an open position, flows through the first directional valve 14, and into the port 44. The air then travels from the port 44 into the reservoir 11. Once the requisite amount of air has reached the reservoir 11, the valve 14 will close preventing any more air from entering the system.

Figure 4:
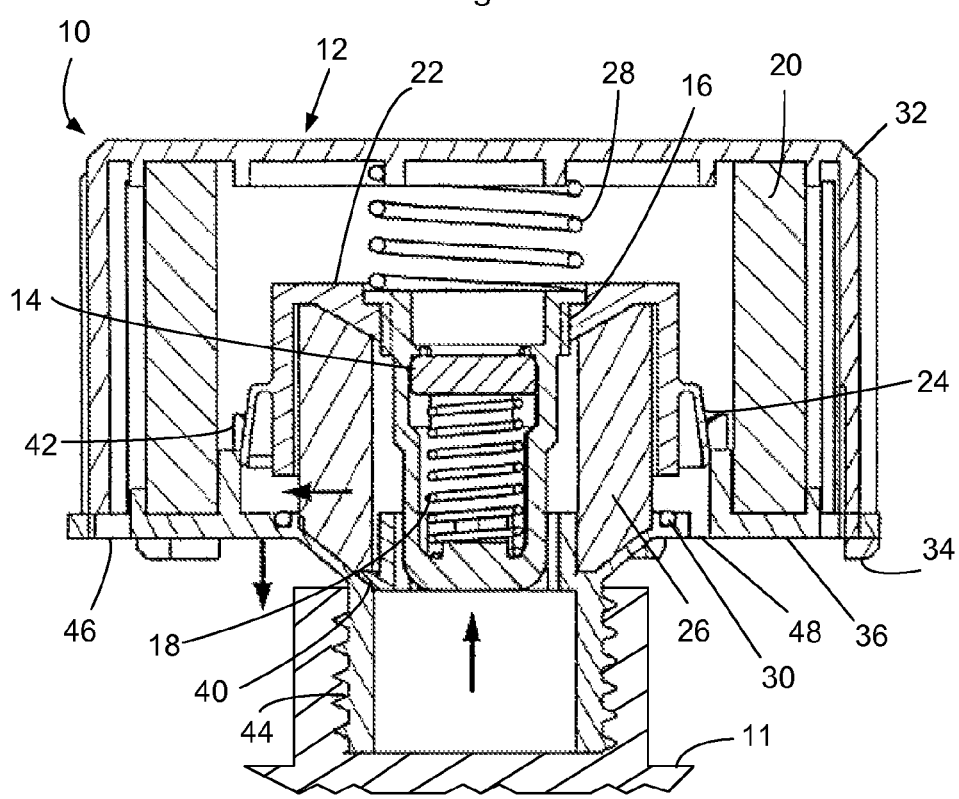
FIG. 4 is a cross-sectional view similar to FIG. 1, but showing the breather assembly in an exhaust flow condition.

Referring now to FIG. 4, illustrated is a condition of the breather assembly 10 when exhaust flow exits from the reservoir 11. When a system needs to expel air due to the pressure in the system, the system will expel air in the reservoir 11 through the breather assembly 10. When this occurs, the second directional valve 22, which can be a direct acting poppet valve, a movable piston, etc., opens to allow air to flow from the reservoir 11 to the breather 10 and ultimately to the atmosphere. The pressure at which the valve 22 operates can be varied based on the type of system for which the breather 10 is being used.

More specifically, when the pressure builds up in the reservoir 11, air is directed toward the breather assembly 10. The air enters the breather 10 through the port 44. The air then moves the second directional valve 22 from the closed position to the open position, which remains sealed in the housing 12 by the lip seal 24, allowing the air to flow into the second flow path and out the outlet 48. If the second directional valve 22 is a movable piston, the piston is moved up, compressing the spring 28 that biases the second directional valve 22 toward its closed position at normal pressure. After the air exits the second directional valve 22, it can pass through the liquid/particulate separation device 26 before exiting the breather 10. The liquid/particulate separation device 26 can be a coalescing media, such as a coalescing polyurethane foam, a tortuous path, etc. The liquid/particulate separation device 26 can separate a fluid, such as oil, from the air, allowing for reduced oil exhaust from the breather 10. Once the requisite amount of air has exited the breather 10, the second directional valve 22 closes preventing any more air from exiting the reservoir 11. If the liquid/particulate separation device 26 includes a coalescing foam, the foam material can be configured to expand to fill any voids between the foam and the piston.

When the second directional valve 22 returns to its closed position, it can compress the liquid/particulate separation device 26 forcing the oil coalesced from the air back into the reservoir 11 via drain 40. For example, if a coalescing polyurethane foam is used as the liquid/particulate separation device 26, when the second directional valve 22 returns to its closed position, it will compress the foam forcing the oil toward the drain 40 below the foam leading to the port 44. The oil will travel from the drain 40 into the port 44, and then back to the reservoir 11 thereby saving oil as well as preventing oil exhaust.

Figure 5:
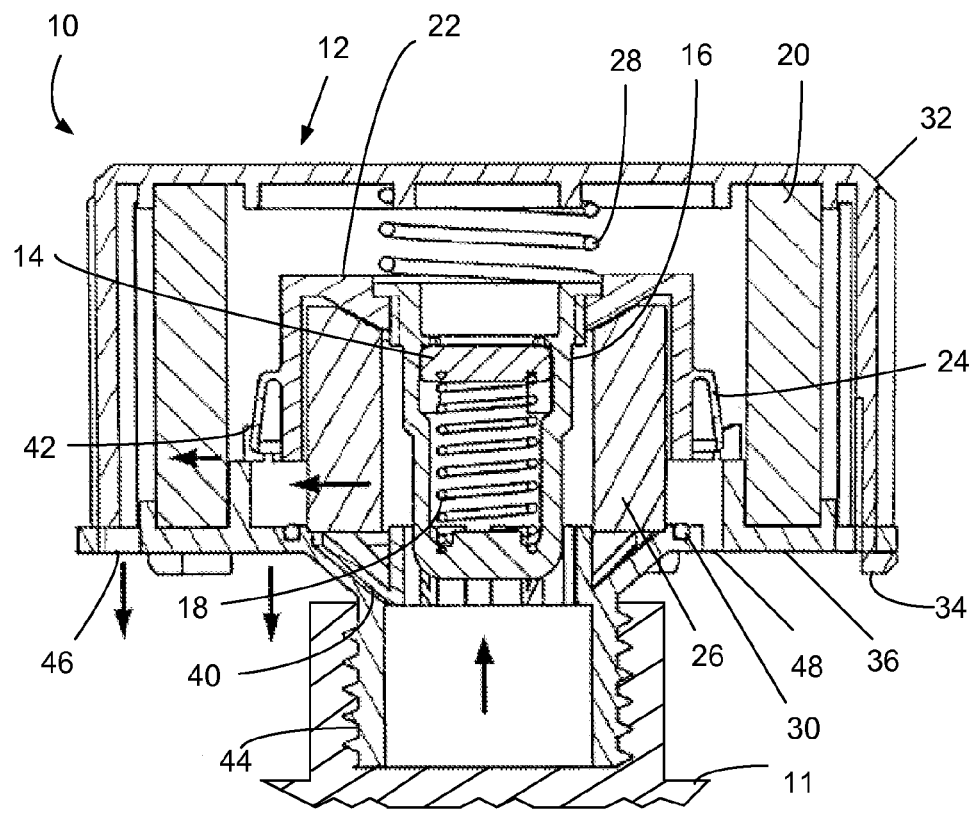
FIG. 5 is a cross-sectional view similar to FIG. 1, but showing the breather assembly in a relief flow condition.

Referring now to FIG. 5, illustrated is a condition of the breather assembly 10 when relief exhaust flow exits the breather 10. Generally, the pressure in a reservoir 11 is low enough that normal operation of the breather 10 prevents damage in the reservoir 11. In some extreme instances however, the normal exhaust flow does not allow air to exit the reservoir 11 quickly enough to prevent damage in known breathers. To eliminate the risk of damage, the breather 10 has a fail-safe relief exhaust condition. During relief exhaust, when air is traveling from the reservoir 11 to the port 44, the fail-safe relief exhaust condition allows the second directional valve 22 to travel further than normal. When the second directional valve 22 travels further than normal, the air is allowed to exit the breather assembly 10 through both the outlet 48 and the inlet 46. The air causes the second direction valve 22 to travel further against the spring 28 allowing air to flow into the first and second flow paths and out the inlet 46 and outlet 48, respectively. Guides 42 are provided on the base 36 to ensure that the second directional valve 22 remains seated in its position during relief exhaust.

Figure 6:
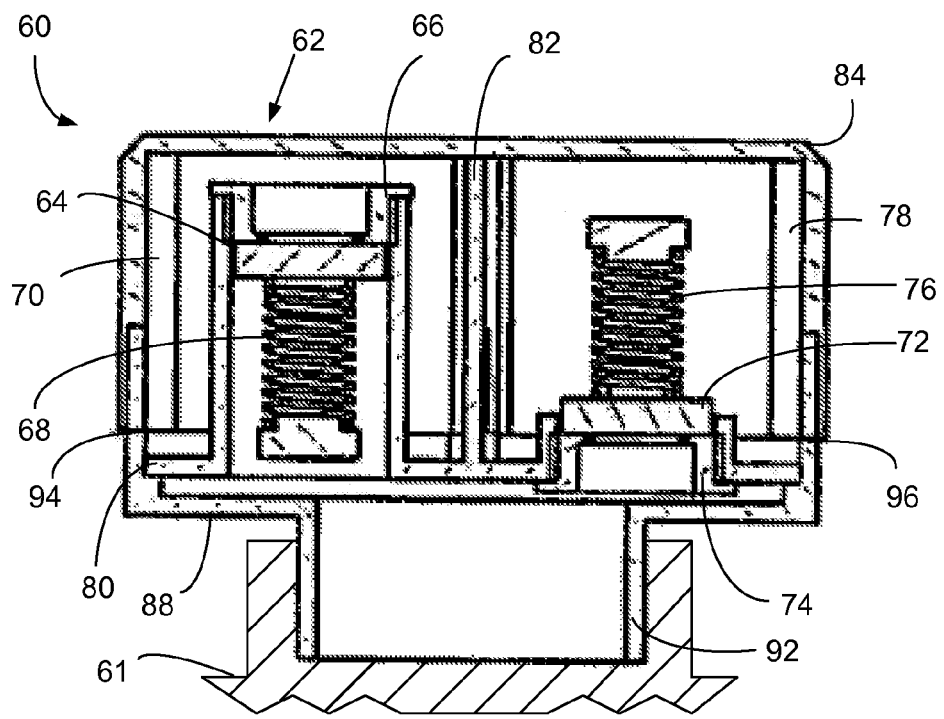
FIG. 6 is a cross-sectional view of another exemplary breather assembly according to the invention.
Figure 8:
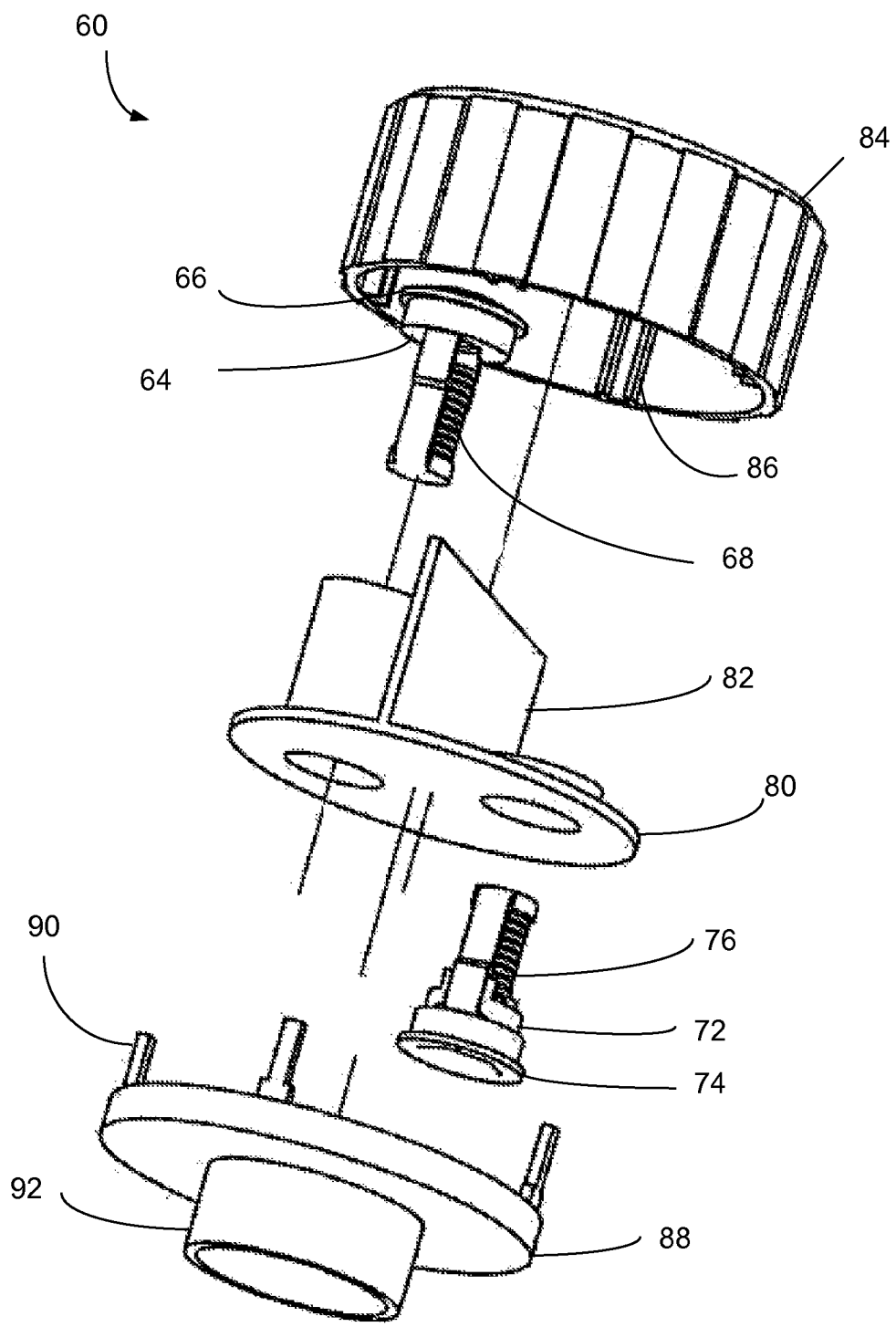
FIG. 8 is an exploded view of the breather assembly of FIG. 6.

Turning now to FIGS. 6 and 8, another embodiment of the breather assembly according to the invention is indicated generally by reference numeral 60. The breather assembly 60 can be used to provide uncontaminated fluid, in particular a gas, into a system, and can also be used to prevent oil mist from escaping a system and to provide a charge pressure on a reservoir of the system. The breather assembly 60 generally includes a housing 62 that encloses a first directional valve 64 and a second directional valve 72, a filtration/separation device 70 disposed in a first flow path, and a second flow path. These major components as well as other components of the device can be made of any suitable material, such as, for example, a polymer material such as nylon or polypropylene, metals, etc.

The first and second directional valves 64 and 72 are responsive to pressures in a reservoir 61 for moving the valves 64 and 72 from a closed position to an open position to permit fluid flow through the breather assembly 10. When the breather 60 is not receiving and expelling fluid, such as air or other gas or vapor, the first and second directional valves 64 and 72 are biased toward a closed position by suitable means to prevent fluid flow below certain pressures. The first directional valve 64 may be biased against a valve seat 66 toward the closed position by a spring 68 and the second directional valve 72 may be biased against a valve seat 74 toward the closed position by a spring 76. The springs 68 and 76 can be of varying forces to allow air to enter and exit the system based on a desired reservoir pressure. As shown, the first and second directional valves 64 and 72 are disposed in the housing 62 in a side by side configuration in a reverse orientation, although it should be appreciated that other configurations are possible, such as the valves 64 and 72 being disposed in the housing 62 in a horizontal configuration.

Referring now to the filtration/separation device 70, the device 70 may be of any suitable type for filtering particulates and/or separating liquid from the air. In a preferred embodiment the filtration/separation device 70 may be a filtration device such as paper, glass, a melt blown filtration device, etc., although it will be appreciated that other types of filtration/separations devices can be used. Along with the filtration/separation device 70, also enclosed in the housing 62 is a liquid/particulate separation device 78 disposed in the second flow path, the second flow path being separate from the first flow path. The liquid/particulate separation device 78 may be of any suitable type for separating a liquid and/or filtering particulates from the air passing through the device 78. In a preferred embodiment, the liquid/particulate separation device 78 may be a filtration device, coalescing media, tortuous path, or any other way of separating a liquid droplet or mist from a gaseous stream or causing a change in the direction of a gas. The devices 70 and 78 can separate particulates out of the air to maintain air quality in the reservoir 61, prevent contamination of fluid in the reservoir 61, and separate fluid out of the air to promote cleanliness of the surrounding environment.

Also included in the housing 62 is a valve plate 80 that includes a wall 82 separating the first and second flow paths. The wall 82, which can be, for example, a plate, divides a chamber in the housing 62 into the first and second flow paths. The wall 82 ensures that the air entering and exiting the breather 60 is separate to so the filtration/separation device 70 is not exposed to oil mist in the reservoir 61, which would increase the pressure drop across the filtration/separation device 70. Separating the flow paths also prevents reverse flow to the filtration/separation device 70 and/or liquid/particulate separation device 78 that would adversely affect the filtration capabilities of the devices. Further, separating the flow paths allows for increased filtration efficiency, reduced oil exhaust, and protection of the system. In one embodiment, the breather 60 could be divided on either side of the wall 82 and then separately mounted to the reservoir 61.

To form the housing 62, a cap 84 and a base 88 are provided, which may be removably coupled to one another by slots 86 in the cap 84 that couple to pins 90 on the base 88. The cap 84, however, may be removably coupled to the base 88 by other suitable means, such as by clamps, fasteners, adhesives, ultrasonic welding, etc. The base 88 can include a port 92, or be coupled to the port 92, for making fluidic communication with the reservoir 61. The port 92 is provided with a threaded portion to secure the breather 60 to the reservoir 61, although the breather 60 may be secured to the reservoir 61 by other suitable means such as by fasteners, clamps, etc. The port 92 may be coupled to the reservoir 61 by the threads, coupled to a hose that is coupled to the reservoir 61, etc. Although the housing 62 is shown as including the cap 84 and the base 88, the housing 62 may be formed as one part or as multiple parts of varying configurations. An exploded view of the breather assembly 60 is provided in FIG. 8, which provides an example of how the parts of the assembly 60 communicate.

With further reference to FIG. 6, the housing 62 further includes an inlet 94 for receiving air and an outlet 96 for expelling air. As shown, the inlet 94 and outlet 96 are disposed on the sides of housing 60, although it should be noted that the inlet 94 and outlet 96 can be located in various other locations on the breather assembly 60, such as the top or the bottom of the breather 60. The filtration/separation device 70 can be disposed in the first flow path between the inlet 94 and the port 92, and the liquid/particulate separation device 78 can be disposed in the second flow path between the port 92 and the outlet 96. The filtration/separation device devices 70 and the liquid/particulate separation device 78 can be configured with one device on each side of the wall 82.

Referring now to the air in-take function of the breather 60, when the system requires air due to the pressure level in the system, the system can receive air through the breather assembly 60. When this occurs, the first directional valve 64, which can be a direct acting poppet valve, a movable piston, etc., opens to allow air to flow from outside the breather 60 into the reservoir 61. More specifically, when air enters the breather assembly 60 through the inlet 94 when the system requires air, the air passes through the first flow path into the filtration/separation device 70 where particulates, liquid, and contaminates are separated from the air. The air then continues to flow through the first flow path toward the first directional valve 64 that is in an open position, flows through the first directional valve 64, and into the port 92. The air then travels from the port 92 into the reservoir 61. Once the requisite amount of air has reached the reservoir 61, the first directional valve 64 will close preventing any more air from entering the reservoir 61.

Referring now to the air exhaust function of the breather 60, when the system needs to expel air due to high pressure in the system, the reservoir 61 will expel the air through the breather assembly 60. When this occurs, the second directional valve 72, which can be a direct acting poppet valve, a movable piston, etc., opens to allow air to flow from the reservoir 61 to the breather 60 and ultimately to the atmosphere. More specifically, when the pressure builds up in the reservoir 61, air is directed toward the breather assembly 60. The air enters the breather 60 through the port 92 and the second directional valve 72 is forced open, allowing the air to flow into the second flow path and out the outlet 96. After the air exits the second directional valve 72, it can pass through a liquid/particulate separation device 78 before exiting the breather 60. The liquid/particulate separation device 78 can be a coalescing media, such as a coalescing polyurethane foam, a tortuous path, etc. and can separate a fluid, such as oil, from the air, allowing for reduced oil exhaust from the breather 60. Once the requisite amount of air has exited the breather 60, the second directional valve 72 will close preventing any more air from exiting the reservoir 61.

Additionally, the in-take and exhaust functions, as described above, can be accomplished by using two separate breather assemblies. One breather assembly can include an inlet, a filtration/separation device, and an inlet directional valve configured to allow air into the reservoir. The second breather assembly can include an outlet, a liquid/particulate separation device, and an outlet directional valve configured to allow air to exit the reservoir. When the pressure in the reservoir is low, air is received at the inlet, is filtered in the filtration/separation device, and passes through the inlet directional valve configured in an open position. When the pressure in the reservoir is high, air exits the outlet directional valve configured in an open position, passes through a liquid/particulate separation device to coalesce oil from the air, and exits the breather assembly through the outlet. Separating the breathers provides another way of ensuring that the flow paths remain separate while the in-take and exhaust functions are performed.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A breather apparatus for use with a reservoir, the breather apparatus providing for the flow of uncontaminated fluid to and from the reservoir along separate flow paths, the breather apparatus including:
a housing having an inlet for receiving fluid, an outlet separate from the inlet for expelling fluid, and a port for fluidic communication with the reservoir, wherein the housing encloses a first directional valve and a second directional valve for regulating fluid flow to and from the reservoir, a filtration/separation device disposed in a first flow path between the inlet and the port for filtering the fluid received at the inlet, a second flow path between the port and the outlet, and a liquid/particulate separation device disposed in the second flow path between the ort and the outlet for separating a liquid from the fluid expelled from the reservoir, wherein the liquid/particulate separation device is a coalescing media, wherein the liquid coalesced in the coalescing media is returnable to the reservoir, and wherein the first flow path is separate from the second flow path, and wherein the first and second directional valves are concentric.

2. A breather apparatus according to claim 1, wherein the first directional valve is disposed in a body of the second directional valve.

3. A breather apparatus according to claim 2, wherein the piston is disposed in the housing against a seal.

4. A breather apparatus according to claim 1, wherein the second directional valve includes a movable piston responsive to pressure in the reservoir.

5. A breather apparatus according to claim 4, wherein the piston is spring-biased.

6. A breather apparatus according to claim 1, wherein the filtration/separation device disposed in the first flow path and the liquid/particulate separation device disposed in the second flow path are concentrically arranged in the housing.

7. A breather apparatus according to claim 1, wherein the liquid/particulate separation device disposed in the second flow path is a coalescing polyurethane foam.

8. A breather apparatus according to claim 1 in combination with the reservoir, the breather having its port in combination with a port of the reservoir.

9. A breather apparatus according to claim 1, wherein the inlet is radially outwardly spaced from the outlet.

10. A breather apparatus according to claim 1, wherein the inlet and outlet are in an underside of the housing.

11. A breather apparatus according to claim 1, wherein the second directional valve is movable between a first position preventing flow from the reservoir to the outlet, a second position allowing flow from the reservoir to the outlet, and a relief exhaust position allowing flow from the reservoir to the inlet and the outlet.

12. A breather apparatus according to claim 11, wherein the second directional valve is biased in the first position by a spring, is configured to travel against the spring to the second position, and is configured to travel further against the spring to the relief exhaust position.

13. A method for filtering fluid in a breather, the breather having an inlet and outlet separate from the inlet, a filtration/separation device, at least first and second directional valves that are concentric, and a first flow path separate from a second flow path, the method including:
receiving fluid in a reservoir via the first flow path to provide fluid in the reservoir, wherein fluid enters the inlet, is filtered in the filtration/separation device, and enters the reservoir through the first directional valve, and
expelling fluid from the reservoir via the second flow path when there is a pressure build up in the reservoir, wherein fluid exits the reservoir through the second directional valve and exits the outlet,
wherein receiving fluid includes using directional valve disposed in a body of movable piston, and wherein expelling fluid includes using the movable piston,
wherein the piston travels against as spring allowing fluid to flow through the second flow path, and
wherein the piston travels further against the spring to allow the fluid to flow through the second flow path and the first flow path.

14. A method according to claim 13, wherein receiving and expelling fluid includes using the first and second directional valves configured in reverse orientation.

15. A breather apparatus for use with a reservoir, the breather apparatus providing for the flow of uncontaminated fluid to and from the reservoir along separate flow paths, the breather apparatus including:
a housing having an inlet for receiving fluid, an outlet for expelling fluid, and a port for fluidic communication with the reservoir, wherein the housing encloses a first directional valve and a second directional valve for regulating fluid flow to and from the reservoir, a filtration/separation device disposed in a first flow path between the inlet and the port for filtering the fluid received at the inlet, and a liquid/particulate separation device disposed in a second flow path between the port and the outlet for separating a liquid from the fluid expelled from the reservoir, wherein the second directional valve is configured to compress the liquid/particulate separation device to force liquid in the liquid/particulate separation device towards the reservoir, and wherein the first flow path is separate from the second flow path.

16. A breather apparatus according to claim 15, wherein the filtration/separation device disposed in the first flow path and the liquid/particulate separation device disposed in the second flow path are concentrically arranged in the housing.

17. A breather apparatus according to claim 15, wherein the filtration/separation device disposed in the first flow path filters the fluid received at the inlet contaminants and liquid and the liquid/particulate separation device disposed in the second flow path coalesces fluid from the fluid expelled from the reservoir.

18. A breather apparatus according to claim 17, wherein the fluid coalesced in the liquid/particulate separation device disposed in the second flow path is returned to the reservoir via a drain.

* * * * *